United States Patent
Dzierzega et al.

(10) Patent No.: US 11,633,801 B2
(45) Date of Patent: Apr. 25, 2023

(54) RESISTANCE WELDING BY MEANS OF ROBOTS

(71) Applicant: KUKA Deutschland GmbH, Augsburg (DE)

(72) Inventors: Christoph Dzierzega, Graben (DE); Martin Wiedenmann, Lauingen (DE)

(73) Assignee: KUKA Deutschland GmbH, Augsburg (DE)

( * ) Notice: Subject to any disclaimer, the term of this patent is extended or adjusted under 35 U.S.C. 154(b) by 210 days.

(21) Appl. No.: 16/962,888

(22) PCT Filed: Jan. 17, 2019

(86) PCT No.: PCT/EP2019/051101
§ 371 (c)(1),
(2) Date: Jul. 17, 2020

(87) PCT Pub. No.: WO2019/141756
PCT Pub. Date: Jul. 25, 2019

(65) Prior Publication Data
US 2021/0362265 A1 Nov. 25, 2021

(30) Foreign Application Priority Data
Jan. 19, 2018 (DE) .................... 10 2018 200 883.3

(51) Int. Cl.
*B23K 11/11* (2006.01)
*B23K 9/095* (2006.01)
*B23K 11/31* (2006.01)

(52) U.S. Cl.
CPC .......... *B23K 11/115* (2013.01); *B23K 9/0953* (2013.01); *B23K 11/314* (2013.01)

(58) Field of Classification Search
CPC ..... B23K 11/115; B23K 11/314; B23K 9/095; B23K 9/0953
See application file for complete search history.

(56) References Cited

U.S. PATENT DOCUMENTS

| 5,510,593 A | 4/1996 | Sakai |
| 5,582,747 A * | 12/1996 | Sakai .................... B23K 11/115 |
| | | 901/42 |

(Continued)

FOREIGN PATENT DOCUMENTS

| CN | 103358308 A | 10/2013 |
| EP | 0640428 A1 | 3/1995 |
| JP | 2013202692 A | 10/2013 |

OTHER PUBLICATIONS

European Patent Office; Search Report in related International Patent Application No. PCT/EP2019/051101 dated Apr. 4, 2019; 13 pages.

(Continued)

*Primary Examiner* — Dana Ross
*Assistant Examiner* — James F Sims, III
(74) *Attorney, Agent, or Firm* — Dorton & Willis, LLP

(57) ABSTRACT

A method for electric welding a workpiece arrangement having at least one workpiece with the aid of a robot arrangement including at least one robot. A rotational movement is carried out between the workpiece arrangement to be welded and at least one welding electrode which contacts the workpiece arrangement. The rotational movement is started as a function of a commanded and/or detected welding start and/or ended as a function of a commanded and/or detected welding end. The direction of rotation of the movement may be changed as a function of a predefined parameter during contact between the welding electrode and the workpiece arrangement.

11 Claims, 1 Drawing Sheet

(56) References Cited

U.S. PATENT DOCUMENTS

2008/0047938 A1  2/2008  Rippl
2013/0256278 A1  10/2013  Garza et al.
2014/0061168 A1  3/2014  Nakakura et al.
2015/0283644 A1  10/2015  Kawai et al.

OTHER PUBLICATIONS

Chinese Patent Office; Search Report in related Chinese Patent Application No. 201980009010.2 dated Oct. 9, 2021; 8 pages.
Chinese Patent Office; Search Report in related Chinese Patent Application No. 201980009010.2 dated Jun. 6, 2022; 5 pages.

* cited by examiner

RESISTANCE WELDING BY MEANS OF ROBOTS

CROSS-REFERENCE TO RELATED APPLICATIONS

This application is a national phase application under 35 U.S.C. § 371 of International Patent Application No. PCT/EP2019/051101, filed Jan. 17, 2019 (pending), which claims the benefit of priority to German Patent Application No. DE 10 2018 200 883.3, filed Jan. 19, 2018, the disclosures of which are incorporated by reference herein in their entirety.

TECHNICAL FIELD

The present invention relates to a method for the electric welding of a workpiece arrangement with the aid of a robot arrangement, a controller for controlling the robot arrangement, a system having the robot arrangement and the controller, and a computer program product for carrying out the method.

BACKGROUND

Rotating a welding gun about an electrode axis during robot-assisted resistance welding is known from internal practice. In this way, the welding result can be improved and, in particular, an adherence of the electrodes can be counteracted.

In this case, according to internal practice, a start and a duration of a rotational movement of the welding gun are predefined in advance in accordance with a predefined welding time. If the welding time is not known in advance, since it varies in terms of control techniques, for example due to different materials or the like, according to internal practice, the duration of the rotational movement of the welding gun is predefined in advance in accordance with a maximum welding time, in order to avoid welding without rotational movement. This results in disadvantageously longer process times.

SUMMARY

The object of the present invention is to improve robot-assisted welding. This object is achieved by a method as described herein, a controller or a computer program product for carrying out the method, or a system having a controller as described herein.

According to one embodiment of the present invention, a (relative) rotational movement is carried out for or during the electric welding of one or more, in particular at least two, workpiece(s) of a workpiece arrangement with the aid of a robot arrangement comprising one or more robots, between the workpiece arrangement to be welded and one or more welding electrode(s), which contacts/contact the workpiece arrangement.

In one embodiment, the welding is resistance and/or spot welding and/or the or one or more of the workpiece(s) is/are made of metal and/or in sheet-metal form, it can in particular be a light metal, in particular aluminum sheet or the like. The welding electrode(s) is/are in one version (an) electrode(s) of a welding gun. In one embodiment, the or at least one of the welding electrode(s) can be a movable electrode, which can be reversibly adjusted or adjusted in a closing direction with the aid of a welding gun-internal or welding gun drive, in particular in order to contact the workpiece arrangement.

In one embodiment, the robot arrangement, in particular at least one robot of the robot arrangement, guides the welding electrode(s). In one embodiment, the robot arrangement, in particular at least one robot of the robot arrangement, additionally or alternatively guides the workpiece arrangement.

In each case, in particular in combination, this represents a particularly advantageous use of the present invention, since a rotational movement controlled inventively has a particularly advantageous effect here.

In one embodiment, a rotation axis of the rotational movement forms an angle with a closing direction of the movable welding electrode and/or a connecting axis of contact points of the welding electrode and a further welding electrode forms an angle with the workpiece arrangement or with the so-called electrode axis, said angle being 45 degrees at most, in one embodiment 30 degrees at most, in particular 15 degrees at most, and in one embodiment at least essentially 0 degrees.

In one embodiment, the rotational movement is additionally or alternatively carried out with a predefined constant rotation velocity, in particular up to an initial acceleration and final braking phase.

As a result, the welding result can be improved particularly advantageously in each case, in particular in combination.

According to one embodiment of the present invention, the rotational movement is ended, in particular automatically, as a function of a commanded and/or detected welding end, in particular during operation or during welding. Accordingly, in one embodiment, the method comprises the following steps: commanding and/or detecting a welding end, in particular during operation or during welding, and ending the rotational movement as a function of the commanded or detected welding end. The welding end can in particular be an upcoming or forecast or current welding end.

In this way, in one embodiment, a sufficiently long(-lasting) rotational movement can advantageously be ensured compared to a predefined duration of the rotational movement, preferably avoiding (further) welding without rotational movement, and additionally or alternatively, an unnecessarily long(-lasting) rotational movement can be avoided.

Additionally or alternatively, the rotational movement according to one embodiment of the present invention is started, in particular automatically, as a function of a commanded and/or detected welding start. Accordingly, in one embodiment, the method comprises the following steps: commanding and/or detecting a welding start, in particular during operation, and starting the rotational movement as a function of the commanded or detected welding start. The welding start can in particular be an upcoming or forecast or current welding start.

In this way, in one embodiment, (initial) welding without rotational movement can advantageously be avoided compared to a predefined start of the rotational movement, and additionally or alternatively an unnecessarily long(-lasting) rotational movement can be avoided.

In one embodiment, commanding a welding start or end can comprise, in particular, processing or executing a corresponding command of a work program. Accordingly, an upcoming welding start or an upcoming welding end can be detected in an execution on the basis of a corresponding command of a work program, in particular a corresponding command of a work program, the execution of which is imminent.

In one embodiment, the rotational movement is started and/or ended as a function of a commanded and/or detected welding current, in particular as a function of a commanded and/or detected welding current drop or welding current end and/or as a function of a commanded and/or detected welding current increase or welding current start. In one embodiment, the rotational movement is thus started and/or ended or triggered by a welding current controller. Accordingly, in one embodiment, the method comprises the following steps: commanding and/or detecting a welding current drop, in particular welding current end, in particular during operation or during welding, and ending the rotational movement as a function of the commanded or detected welding current drop or end; and/or the steps: commanding and/or detecting a welding current increase, in particular welding current start, in particular during operation, and starting the rotational movement as a function of the commanded or detected welding current increase or start. The welding current drop or increase can be, in particular, an upcoming or forecast or current welding current drop or increase.

In this way, in one embodiment, a sufficiently long(-lasting) rotational movement can particularly advantageously be ensured, preferably avoiding welding without rotational movement, and additionally or alternatively, an unnecessarily long(-lasting) rotational movement can be avoided.

In one embodiment, the rotational movement is started at a predefined time, which in one embodiment can be set before the (commanded) or after the (commanded or detected) welding start, in particular welding current increase or welding current start, and/or ended at a predefined time, which in one embodiment can be set before the (commanded) or after the (commanded or detected) welding end, in particular welding current drop or welding current end.

In particular, the start and/or the end of the rotational movement can therefore be delayed by a predefined value. Likewise, the start and/or the end of the rotational movement can be brought forward by a predefined value before starting or ending, for example by recognizing a corresponding command in advance or in turn, be delayed in relation to the start or end of the rotational movement.

In this way, a particularly advantageous welding result can be guaranteed in one embodiment.

Additionally or alternatively to the aspect of starting and/or ending the rotational movement as a function of a commanded or detected welding start or end, according to one embodiment of the present invention, the direction of rotation of the rotational movement is changed as a function of a predefined parameter during contact between welding electrode(s) and workpiece arrangement, in particular during welding.

In this way, the welding result can advantageously be improved in one embodiment compared to a unidirectional rotational movement. In one embodiment, additionally or alternatively, the rotational movement can in principle be carried out indefinitely in this way, in particular until it is ended in one embodiment as a function of the commanded or detected welding end.

In one embodiment, the direction of rotation is changed during contact between welding electrode and workpiece arrangement, in particular during welding, as a function of (a) predefined rotation angle(s) which in one embodiment can be set, in particular when said rotation angle(s) is/are reached, and/or as a function of a predefined rotation time which in one embodiment can be set, in particular when said rotation time is reached, in particular when the rotation angle is reached in terms of magnitude or alternatively when predefined rotation angles of different signs are reached or periodically when the rotation time is reached or (if appropriate) several times.

In this way, the welding result can be particularly advantageously improved in one embodiment and/or the rotational movement can in principle be carried out indefinitely, in particular until it is ended in one embodiment as a function of the commanded or detected welding end.

According to one embodiment of the present invention, a controller for controlling the robot arrangement, in particular hardware and/or software, in particular program technology, for carrying out a method described here, is set up according to one of the preceding claims and/or has means for starting and/or ending a rotational movement carried out with the aid of the robot arrangement between the workpiece arrangement to be welded and the at least one welding electrode, which contacts the workpiece arrangement, as a function of the commanded and/or detected welding start (for starting the rotational movement) or welding end (for ending the rotational movement) and/or for changing the direction of rotation of this rotational movement as a function of a predefined parameter during contact between welding electrode and workpiece arrangement, in particular during welding.

In one embodiment, the controller or its means comprises:
means for commanding and/or detecting a welding start, in particular during operation, and for starting the rotational movement as a function of the commanded or detected welding start; and/or means for commanding and/or detecting a welding end, in particular during operation or during welding, and for ending the rotational movement as a function of the commanded or detected welding end; and/or means for starting the rotational movement as a function of a commanded and/or detected welding current, in particular welding current increase or welding current start, in particular means for commanding and/or detecting a welding current increase, in particular welding current start, in particular during operation, and for starting the rotational movement as a function of the commanded or detected welding current increase or start; and/or means for ending the rotational movement as a function of a commanded and/or detected welding current, in particular welding current drop or welding current end, in particular means for commanding and/or detecting a welding current drop, in particular welding current end, in particular during operation or during welding, and for ending the rotational movement as a function of the commanded or detected welding current drop or end; and/or means for carrying out the rotational movement at a predefined rotation velocity; and/or means for starting the rotational movement at a predefined time, which in one embodiment can be set before the (commanded) or after the (commanded or detected) welding start, in particular welding current increase or welding current start, and/or for ending the rotational movement at a predefined time, which in one embodiment can be set before the (commanded) or after the (commanded or detected) welding end, in particular welding current drop or welding current end; and/or means for changing the direction of rotation during contact between welding electrode and workpiece arrangement, in particular during welding, as a function of (a) predefined rotation angle(s) which in one embodiment can be set, in particular when said rotation angle(s) is/are reached, and/or as a function of a predefined rotation time which in one embodiment can be set, in particular when said rotation time is reached, in particular when the rotation angle is reached in terms of magnitude or alternatively when predefined rotation angles of different signs are reached or periodically when the rotation time is reached or (if appropriate) several times.

For the purposes of the present invention, a means can be designed as hardware and/or software, comprising in particular a digital processing unit, in particular a microprocessor unit (CPU), which is preferably data or signal-connected with a storage system and/or bus system, and/or one or more programs or program modules. The CPU can be designed to process commands which are implemented as a program stored in a storage system, to acquire input signals from a data bus and/or to output signals to a data bus. A storage system can comprise one or more, in particular different, storage media, in particular optical, magnetic, solid-state and/or other non-volatile media. The program can be designed in such a way that it embodies or is capable of carrying out the methods described here, so that the CPU can carry out the steps of such methods and thus in particular can control the robot arrangement. In one embodiment, a computer program product can comprise a storage medium, in particular a non-volatile storage medium, for storing a program or with a program stored thereon, wherein running this program prompts a system or a controller, in particular a computer, to carry out a method described here or one or more of its steps.

In one embodiment, one or more, in particular all, steps of the method are carried out fully or partially automatically, in particular by the controller or its means.

According to one embodiment of the present invention, a system comprises the robot arrangement and the controller. In one embodiment, the system, in particular the robot arrangement, can comprise the welding electrode(s).

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
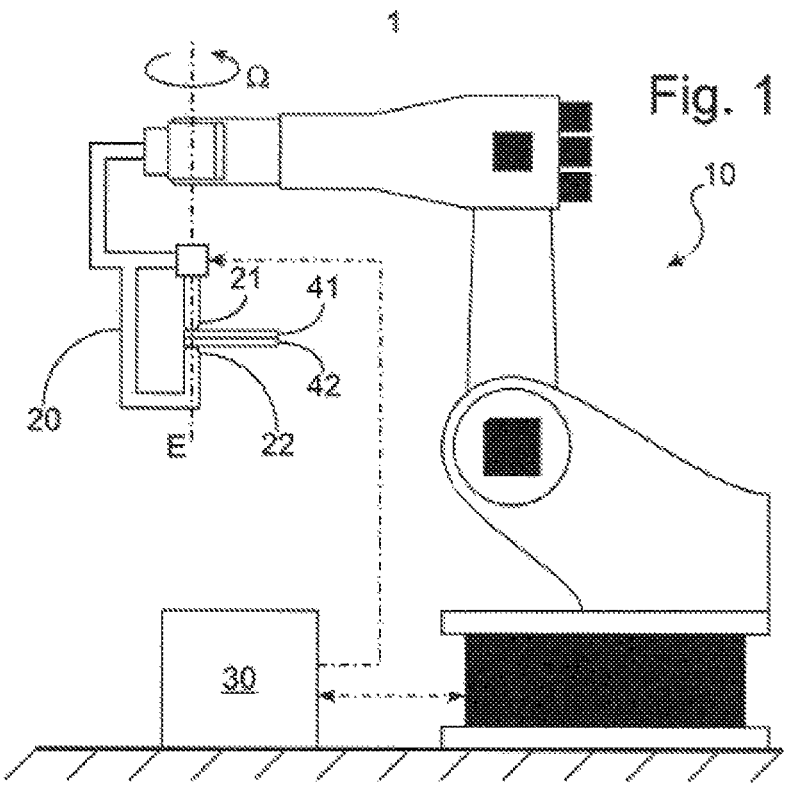
FIG. 1 shows a system having a robot arrangement and a controller for controlling the robot arrangement.

FIG. 1 shows a system having a robot arrangement in the form of a robot 10 having a robot-guided welding gun 20, which comprises a movable welding electrode 21 and a fixed welding electrode 22, and a controller 30 for controlling the robot arrangement for the electric welding of a workpiece arrangement having two workpieces 41, 42 according to one embodiment of the present invention.

Figure 2:
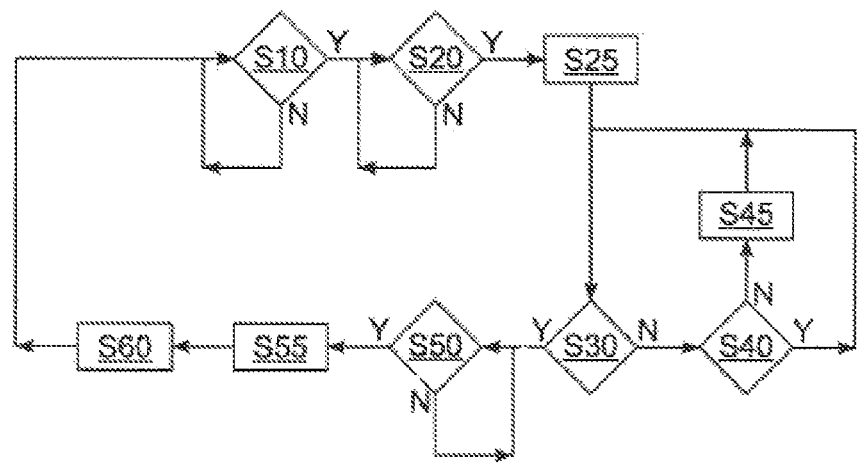
FIG. 2 shows a method for the electric welding of a workpiece arrangement with the aid of the robot arrangement.

FIG. 2 shows a method for the electric welding of the workpiece arrangement 41, 42 with the aid of the robot arrangement according to one embodiment of the present invention.

In one step S10, it is checked whether a welding start, in particular a welding current start or increase, has been commanded. As long as this is not the case (S10: "N"), the request is repeated.

If a welding start has been commanded (S10: "Y"), it is checked in one step S20 whether a predefined first time has elapsed since this detection. As long as this is not the case (S20: "N"), the request is repeated.

If the predefined first time has elapsed since the detection in step S10 (S20: "Y"), a rotational movement $\Omega$ of the welding gun 20 about the electrode axis E is started in one step S25 (see FIG. 1).

In one step S30, it is checked whether a welding end, in particular a welding current end or drop, has been commanded.

If this is not the case (S30: "N"), it is checked in one step S40 whether a predefined rotation angle of the welding gun 20 about the electrode axis E has been reached in terms of magnitude by the rotational movement $\Omega$.

If this is not the case (S40: "N"), the method returns to step S30. The rotational movement $\Omega$ is thus resumed in this case.

If it is determined in step S40 that the predefined rotation angle of the welding gun 20 about the electrode axis E has been reached in terms of magnitude by the rotational movement $\Omega$ (S40: "Y"), the direction of rotation of the rotational movement is changed in step S45 ($\Omega \rightarrow -\Omega$). The method then also returns to step S30. The direction of rotation of the rotational movement is thus changed.

As long as the welding end has not yet been commanded (S30: "N"), steps S40 and if applicable S45 can be carried out several times and thus the direction of rotation of the rotational movement can be changed several times or when the predefined rotation angle is reached in terms of magnitude.

If a welding end has been commanded (S30: "Y"), it is checked in one step S50 whether a predefined second time has elapsed since this detection. As long as this is not the case (S50: "N"), the request is repeated.

If the predefined second time has elapsed since the detection in step S30 (S50: "Y"), the rotational movement of the welding gun 20 about the electrode axis E is ended in one step S55.

The robot 10 then moves to a new weld spot with the welding gun 20 in one step S60 and the method starts again with step S10. Although exemplary embodiments have been explained in the preceding description, it should be pointed out that many variations are possible.

In particular, in step S10 and/or S30, instead of commanding a welding start or end, it can be determined whether such a task is pending. For example, in a work program which has just been processed, a corresponding command is next to be carried out or the like, in particular in this case the rotational movement can also be started and/or ended at a predefined time before the welding start.

It should also be pointed out that the exemplary embodiments are only examples which are not intended to restrict the scope of patent protection, the applications and the structure in any way. Rather, the preceding description provides the person skilled in the art with a guideline for the implementation of at least one exemplary embodiment, it being possible for various changes, in particular with regard to the function and arrangement of the described components, to be carried out without leaving the scope of patent protection, as it results from the claims and these equivalent combinations of features.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

10 Robot (arrangement)
20 Welding gun
21 Movable welding electrode
22 Fixed welding electrode
30 (Robot) controller
41, 42 Workpiece (arrangement)
Ω Rotational movement
E Electrode axis

What is claimed is:

1. A method for the electric welding of a workpiece arrangement having at least one workpiece, with the aid of a robot arrangement including at least one robot, the method comprising:
    actuating the at least one robot to carry out a rotational movement between the workpiece arrangement to be welded and at least one welding electrode that contacts the workpiece arrangement during the electric welding;
    wherein a direction of rotation of the rotational movement is changed as a function of a predefined parameter during contact between the at least one welding electrode and the workpiece arrangement;
    wherein the direction of rotation is changed several times as a function of the predetermined parameter during contact between the at least one welding electrode and the workpiece arrangement;
    wherein the predetermined parameter comprises at least one of a predefined rotation angle or a predefined rotation time; and
    wherein the rotational movement comprises rotating a welding gun comprising the at least one welding electrode about a longitudinal electrode axis of the at least one welding electrode.

2. The method of claim 1, wherein the rotational movement is at least one of started or ended as a function of at least one of a commanded or detected welding current.

3. The method of claim 1, wherein the rotational movement is at least one of:
    started at a predefined time before or after the welding start; or
    ended at a predefined time before or after the welding end.

4. The method of claim 1, wherein:
    at least one of:
        a rotation axis of the rotational movement forms a rotation axis angle with a closing direction of the movable welding electrode, or
        a connecting axis of contact points between the welding electrode and a further welding electrode forms a connecting axis angle with the work-piece arrangement; and
    the at least one of the rotation axis angle or the connecting axis angle is at most 45 degrees.

5. The method of claim 1, wherein the rotational movement is carried out at a predefined rotation velocity.

6. A controller for controlling a robot arrangement configured for the electric welding of a workpiece arrangement having at least one workpiece, the robot arrangement including at least one robot, the controller comprising means for:
    changing a direction of rotation of a rotational movement carried out with the aid of the robot arrangement between the workpiece arrangement to be welded and at least one welding electrode that contacts the workpiece arrangement during the electric welding as a function of a predefined parameter during contact between welding electrode and the workpiece arrangement;
    wherein the direction of rotation is changed several times as a function of the predetermined parameter during contact between the at least one welding electrode and the workpiece arrangement;
    wherein the predetermined parameter comprises at least one of a predefined rotation angle or a predefined rotation time; and
    wherein the rotational movement comprises rotating a welding gun comprising the at least one welding electrode about a longitudinal axis of the at least one welding electrode.

7. A system comprising:
    a robot arrangement including at least one robot and configured for the electric welding of a workpiece arrangement having at least one workpiece; and
    a controller for controlling the robot arrangement, the controller configured to actuate the robot to carry out a rotational movement between the workpiece arrangement to be welded and at least one welding electrode that contacts the workpiece arrangement during the electric welding;
    wherein a direction of rotation of the rotational movement is changed as a function of a predefined parameter during contact between the at least one welding electrode and the workpiece arrangement;
    wherein the direction of rotation is changed several times as a function of the predetermined parameter during contact between the at least one welding electrode and the workpiece arrangement;
    wherein the predetermined parameter comprises at least one of a predefined rotation angle or a predefined rotation time; and
    wherein the rotational movement comprises rotating a welding gun comprising the at least one welding electrode about a longitudinal axis of the at least one welding electrode.

8. A computer program product for electric welding of a workpiece arrangement having at least one workpiece with the aid of a robot arrangement including at least one robot, the program product having a program code stored in a non-transitory, machine-readable data medium, the program code configured to, when executed by a computer, cause the computer to:
    actuate the robot to carry out a rotational movement between the workpiece arrangement to be welded and at least one welding electrode that contacts the workpiece arrangement during the electric welding;
    wherein a direction of rotation of the rotational movement is changed as a function of a predefined parameter during contact between the at least one welding electrode and the workpiece arrangement;
    wherein the direction of rotation is changed several times as a function of the predetermined parameter during contact between the at least one welding electrode and the workpiece arrangement;

wherein the predetermined parameter comprises at least one of a predefined rotation angle or a predefined rotation time; and wherein the rotational movement comprises rotating a welding gun comprising the at least one welding electrode about a longitudinal electrode axis of the at least one welding electrode.

9. A method for the electric welding of a workpiece arrangement having at least one workpiece, with the aid of a robot arrangement including at least one robot comprising a welding gun comprising at least one welding electrode, the method comprising:

starting a welding operation by starting or increasing a welding current delivered by the at least one welding electrode to the workpiece arrangement;

rotating the welding gun about a longitudinal electrode axis of the at least one welding electrode to cause a rotational movement in a first rotational direction about the longitudinal electrode axis between the at least one welding electrode and the workpiece arrangement during the welding operation;

changing the rotational direction of the rotational movement from the first rotational direction to a second rotational direction about the longitudinal electrode axis opposite the first rotational direction upon at least one of reaching a predetermined rotation angle or reaching a predetermined rotation time;

rotating the welding gun about the longitudinal axis of the at least one welding electrode to cause the rotational movement in the second rotational direction between the at least one welding electrode and the workpiece arrangement during the welding operation;

changing the rotational direction of the rotational movement from the second rotational direction to the first rotational direction upon at least one of reaching the predetermined rotation angle or reaching the predetermined rotation time;

rotating the welding gun about the longitudinal axis of the at least one welding electrode to cause the rotational movement in the first rotational direction between the at least one welding electrode and the workpiece arrangement during the welding operation; and ending the welding operation by ending or dropping the welding current delivered by the at least one welding electrode to the workpiece arrangement.

10. The method of claim 9, wherein starting the welding operation by starting or increasing the welding current delivered by the at least one welding electrode to the workpiece arrangement comprises starting the rotational movement in the first direction as a function of at least one of a commanded or detected welding current.

11. The method of claim 9, wherein ending the welding operation by ending or dropping the welding current delivered by the at least one welding electrode to the workpiece arrangement comprises stopping at least one of the rotational movement in the first direction or the rotational movement in the second direction.

* * * * *